United States Patent
Vladimerou (10) Patent No.: US 11,195,027 B2
(45) Date of Patent: Dec. 7, 2021

(54) AUTOMATED CROWD SOURCING OF ROAD ENVIRONMENT INFORMATION

(71) Applicant: Toyota Motor Engineering & Manufacturing North America, Inc., Erlanger, KY (US)

(72) Inventor: Vladimeros Vladimerou, Whitmore Lake, MI (US)

(73) Assignee: TOYOTA MOTOR ENGINEERING AND MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/541,652

(22) Filed: Aug. 15, 2019

(65) Prior Publication Data

US 2021/0049373 A1 Feb. 18, 2021

(51) Int. Cl.
| | |
|---|---|
| *B60W 10/00* | (2006.01) |
| *G06K 9/00* | (2006.01) |
| *G08G 1/16* | (2006.01) |
| *G08G 1/01* | (2006.01) |
| *G01C 21/36* | (2006.01) |
| *B60W 40/04* | (2006.01) |
| *G05D 1/02* | (2020.01) |

(52) U.S. Cl.
CPC ......... *G06K 9/00798* (2013.01); *B60W 40/04* (2013.01); *G01C 21/3658* (2013.01); *G05D 1/0278* (2013.01); *G08G 1/0112* (2013.01); *G08G 1/167* (2013.01); *B60W 2552/35* (2020.02)

(58) Field of Classification Search
CPC ............................... B60W 10/00; G08G 1/00
See application file for complete search history.

(56) References Cited

U.S. PATENT DOCUMENTS

| | | | |
|---|---|---|---|
| 9,373,149 B2 | 6/2016 | Abhyanker | |
| 9,460,624 B2 | 10/2016 | Pandita et al. | |
| 9,672,734 B1* | 6/2017 | Ratnasingam | ....... G08G 1/0968 |
| 10,074,281 B2 | 9/2018 | Pandita et al. | |
| 2013/0214939 A1* | 8/2013 | Washlow | ................. B60Q 9/00 |
| | | | 340/901 |
| 2015/0166072 A1* | 6/2015 | Powers | ................ G08G 1/0129 |
| | | | 701/1 |

(Continued)

FOREIGN PATENT DOCUMENTS

| | | |
|---|---|---|
| AU | 2017300097 A1 | 1/2019 |
| GB | 2556427 A | 5/2018 |

OTHER PUBLICATIONS

International Search Report and Written Opinion for International Patent Application No. PCT/US2020/045802, dated Sep. 16, 2020, 9 pages.

*Primary Examiner* — Shirley Lu (74) *Attorney, Agent, or Firm* — Jordan IP Law, LLC (57) ABSTRACT

Methods and systems to crowd source road related information. The crowd sourced road related information may include lane-specific data related to a lane-level police presence and/or a disabled roadside vehicle presence. The crowd sourced road related information may include lane-level vehicle spacing information. The communication of the lane-specific data to a crowd sourced road condition server may occur automatically in one mode and may occur only after confirmation from a user in another mode.

15 Claims, 5 Drawing Sheets

(56) References Cited

U.S. PATENT DOCUMENTS

| | | | |
|---|---|---|---|
| 2015/0192660 A1* | 7/2015 | Dickow | G08G 1/096758 |
| | | | 340/902 |
| 2016/0371977 A1 | 12/2016 | Wingate et al. | |
| 2017/0192436 A1 | 7/2017 | Min et al. | |
| 2018/0113450 A1 | 4/2018 | Sherony | |
| 2018/0143033 A1 | 5/2018 | Hu | |
| 2019/0103023 A1 | 4/2019 | McNew et al. | |
| 2019/0286151 A1* | 9/2019 | Palanisamy | B60W 60/0011 |

* cited by examiner

AUTOMATED CROWD SOURCING OF ROAD ENVIRONMENT INFORMATION

TECHNICAL FIELD

Embodiments generally relate to vehicle automated crowd sourcing. More particularly, embodiments relate to the automated crowd sourcing of road environment information.

BACKGROUND

Drivers often may be assisted by vehicle navigation applications. These vehicle navigation applications may suffer from lack of updated real-time information, lack of lane-specific information, and/or lack of specific road environment information.

BRIEF SUMMARY

In one embodiment, a system to crowd source road related information, includes a vehicle sensor system and a communication device coupled to the vehicle sensor system. The vehicle sensor system is configured to obtain lane-specific data. The communication device is configured to communicate the lane-specific data to a server and to receive lane-specific conditions from the server. The lane-specific data include a lane-level police presence.

In some implementations of the system, the lane-specific data indicates at least lane-level vehicle spacing information.

In some implementations of the system, the communication of the lane-specific data to the server occurs automatically in one mode and occurs only after confirmation from a user in another mode.

In some implementations of the system, the vehicle sensor system includes one or more of a vehicle camera, a vehicle radar, and a vehicle location system, and where the vehicle location system includes a Global Positioning System.

In some implementations of the system, the lane-specific data indicates at least a disabled roadside vehicle presence.

In some implementations of the system, the lane-specific data includes information related to which lane of a plurality of lanes a condition applies to and one or more of: a lane location, a lane width, a lane edge, a lane edge distance, a curb location, a curb width, a curb distance, a guardrail location, a guardrail size, a guardrail distance, a pull-over lane location, a pull-over lane width, a pull-over lane distance, a shoulder location, a shoulder width, and a shoulder distance.

In some implementations of the system, the lane-specific data includes information related to which lane of a plurality of lanes a condition applies to and one or more of: open and closed lane conditions, accident location, disabled vehicle location, pothole conditions, iced road conditions, traffic jam conditions, and vehicle speed conditions.

In another embodiment, at least one computer readable storage medium includes a set of executable program instructions, which when executed by a computing system, cause the computing system to: obtain, via a vehicle sensor system, lane-specific data; and communicate, via a communication device coupled to the vehicle sensor system, the lane-specific data to a server; and receive, via the communication device, lane-specific conditions from the server. The lane-specific data include a lane-level police presence.

In some implementations of the computer readable storage medium, the communication of the lane-specific data to the server occurs automatically in one mode and occurs only after confirmation from a user in another mode.

In some implementations of the computer readable storage medium, the lane-specific data indicates at least lane-level vehicle spacing information.

In some implementations of the computer readable storage medium, the vehicle sensor system includes one or more of a vehicle camera, a vehicle radar, and a vehicle location system, and where the vehicle location system includes a Global Positioning System.

In some implementations of the computer readable storage medium, the lane-specific data indicates at least a disabled roadside vehicle presence.

In some implementations of the computer readable storage medium, the lane-specific data includes information related to which lane of a plurality of lanes a condition applies to and one or more of: a lane location, a lane width, a lane edge, a lane edge distance, a curb location, a curb width, a curb distance, a guardrail location, a guardrail size, a guardrail distance, a pull-over lane location, a pull-over lane width, a pull-over lane distance, a shoulder location, a shoulder width, and a shoulder distance.

In some implementations of the computer readable storage medium, the lane-specific data includes information related to which lane of a plurality of lanes a condition applies to and one or more of: open and closed lane conditions, crash accident location, disabled vehicle location, pothole conditions, iced road conditions, traffic jam conditions, and vehicle speed conditions.

In yet another embodiment, a method to crowd source road related information, includes: obtaining, via a vehicle sensor system, lane-specific data; communicating, via a communication device coupled to the vehicle sensor system, the lane-specific data to a server; and receiving, via the communication device, lane-specific data from the server. The lane-specific data include a lane-level police presence.

In some implementations of the method, the communication of the lane-specific data to the server occurs automatically in one mode and occurs only after confirmation from a user in another mode.

In some implementations of the method, the lane-specific data indicates at least lane-level vehicle spacing information.

In some implementations of the method, the vehicle sensor system includes one or more of a vehicle camera, a vehicle radar, and a vehicle location system, and where the vehicle location system includes a Global Positioning System.

In some implementations of the method, the lane-specific data indicates at least a disabled roadside vehicle presence.

In some implementations of the method, the lane-specific data includes information related to which lane of a plurality of lanes a condition applies to and one or more of: a lane location, a lane width, a lane edge, a lane edge distance, a curb location, a curb width, a curb distance, a guardrail location, a guardrail size, a guardrail distance, a pull-over lane location, a pull-over lane width, a pull-over lane distance, a shoulder location, a shoulder width, and a shoulder distance.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As described above, drivers often may be assisted by vehicle navigation applications. These vehicle navigation applications may suffer from lack of updated real-time information, lack of lane-specific information, and/or lack of specific road environment information.

As will be described in greater detail below, in some implementations disclosed herein, a system to provide better traffic guidance will automatedly send road environment information related to individual vehicle lanes from a plurality of vehicles. For example, the plurality of vehicles may send the road environment information gathered from a plurality of sensors. The plurality of vehicles may send the road environment information to a designated database (e.g., a cloud database) to crowd source the road environment information. In such implementations, data from the plurality of vehicles and the plurality of sensors (e.g., using radars, lidar, sonar, and/or cameras) may confirm lane-specific road conditions. This raw data from the plurality of vehicles and the plurality of sensors may be uploaded to a crowd sourced road condition database.

In some examples, a system for automated crowd sourcing of road environment information related to individual vehicle lanes may include information regarding one or more of the following: lane speeds, lane densities, lane width, lane edge, lane edge distance, pull-over lane width, guard rail, the like, and/or combinations thereof. Such road environment information related to individual vehicle lanes may be obtained from a plurality of vehicles and a plurality of sensors to a designated database to provide better traffic guidance. Such road environment information may be optionally utilized by crowd sourced road condition application to deliver lane-specific guidance to a driver of a vehicle. As will be described in greater detail below, the vehicle may perform lane identification (or the lane identification may be alternatively performed remotely from the cloud database), uploads observed adjacent lane speeds, densities, the like, and/or combinations thereof to cloud database. A lane-level traffic map may be populated based at least in part on the lane-specific information uploaded to the cloud database.

As used herein, the term "lane-level" and/or "lane-specific" refers to traffic conditions, road conditions, and/or map directions being associated with a specific sub-portion of a roadway, such as an individual lane, shoulder, curb area, etc. instead of to the roadway as a whole.

More specifically, methods and systems will be described below that may provide for technology to crowd source road related information. In some implementations, the crowd sourced road related information may include lane-specific data regarding a lane-level police presence. Additionally or alternatively, the crowd sourced road related information may include lane-level vehicle spacing information. Further, the communication of the lane-specific data to a crowd sourced road condition server may occur automatically in one mode and may occur only after confirmation from a user in another mode.

Figure 1:
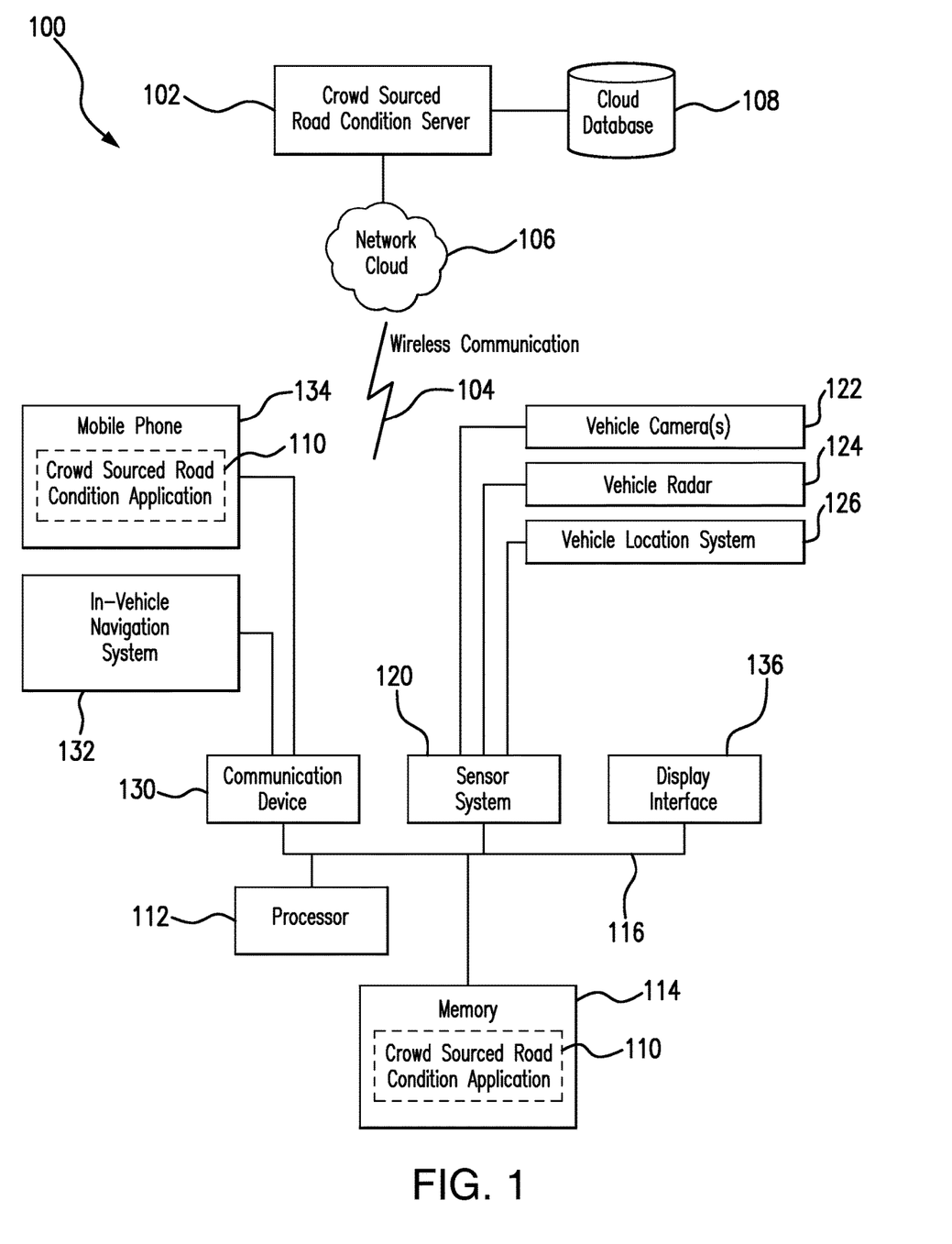
FIG. 1 is a block diagram of an example of a lane-specific guidance system of a vehicle according to an embodiment.

Turning now to FIG. 1, a portion of a vehicle (e.g., car, taxi, shuttle, truck, van, sport utility vehicle/SUV, aircraft, etc.) may include a lane-specific guidance system 100. In an embodiment, lane-specific guidance system 100 may be utilized to crowd source road related information. For example, lane-specific guidance system 100 may communicate lane-specific data (e.g., lane-specific data to a server 102 (e.g., crowd source road condition server) via wireless communication 104 over a network cloud 106.

In some examples, the communication of the lane-specific data to the crowd sourced road condition server 102 from lane-specific guidance system 100 may occur automatically in one mode (e.g., an automatic mode). Alternatively, the communication of the lane-specific data to the crowd sourced road condition server 102 from lane-specific guidance system 100 may occur only after confirmation from a user in another mode (e.g., a user confirmation mode). For example, the automatic mode may be set as a default mode, where a user may choose instead to use the user confirmation mode. Conversely, the user confirmation mode may be set as a default mode, where a user may choose instead to use the automatic mode.

In some examples, crowd source road condition server 102 may store information in a cloud database 108. Crowd source road condition server 102 may support a crowd source road condition application 110. For example, crowd source road condition application 110 may be associated with lane-specific guidance system 100 to present lane-specific guidance to a driver of the vehicle. The crowd sourced road condition application 110 may include or be associated with a modified version of WAZE™, GASBUDDY™, Google Maps™, Apple Maps™, a social media-type road condition application, or a similar map application.

In the illustrated implementation, lane-specific guidance system 100 may be any type of vehicle-installed, handheld, desktop, or other form of single computing device, or may be composed of multiple computing devices. For example, lane-specific guidance system 100 may include one or more processor(s) 112, such as a central processing unit and/or any other type of similar device, or multiple devices, capable of manipulating or processing information. Lane-specific guidance system 100 may include a memory 114, such as a random access memory device (RAM) or any other suitable type of storage device. In the illustrated example, the memory 114 may optionally include crowd source road condition application 110 that may be accessed by the processor 112 using a bus 116.

In some examples, lane-specific guidance system 100 includes a vehicle sensor system 120 to obtain lane-specific data. For example, the vehicle sensor system 120 may include one or more vehicle camera(s) 122, a vehicle radar 124 (and/or lidar or sonar), a vehicle location system 126, the like, and/or combinations thereof. In one example, the vehicle location system 126 may include a Global Positioning System (GPS).

In the illustrated implementation, lane-specific guidance system 100 may include a communication device 130 coupled to the vehicle sensor system 120. In operation, the communication device 130 may communicate lane-specific data to the crowd sourced road condition server 102 and receive lane-specific conditions from the crowd sourced road condition server 102 via wireless communication 104. In one example, the communication device may include an in-vehicle navigation system 132 to facilitate wireless communication 104. Additionally or alternatively, the communication device may include a mobile phone 134 (e.g., personal cell phone) to facilitate wireless communication 104. In the illustrated implementation, crowd source road condition application 110 may be alternatively or additionally run on mobile phone 134 to present lane-specific guidance to a driver of the vehicle. In the illustrated example, such lane-specific guidance may be presented to the driver of the vehicle via a display interface 136 of the vehicle.

In some examples, the crowd sourced road condition server 102 may operate to receive lane-specific data from a plurality of vehicles with a corresponding plurality of vehicle sensor systems (e.g., a plurality of sensor system 120 associated with a corresponding plurality of vehicles). The crowd sourced road condition server 102 may operate to store the lane-specific data to cloud database 108. The crowd sourced road condition server 102 then may update a lane-specific traffic map in response to the received lane-specific data from the plurality of vehicles. The crowd sourced road condition server 102 may provide lane-specific guidance to individual drivers in response to the received lane-specific data from the plurality of vehicles.

In the illustrated example, lane-specific guidance system 100 may be configured to operate in the absence of a self-driving vehicle system. For example, lane-specific guidance system 100 may be implemented in a vehicle that does not include self-driving capabilities. In other examples, lane-specific guidance system 100 may be configured to operate in conjunction with such a self driving vehicle system.

Figure 2:
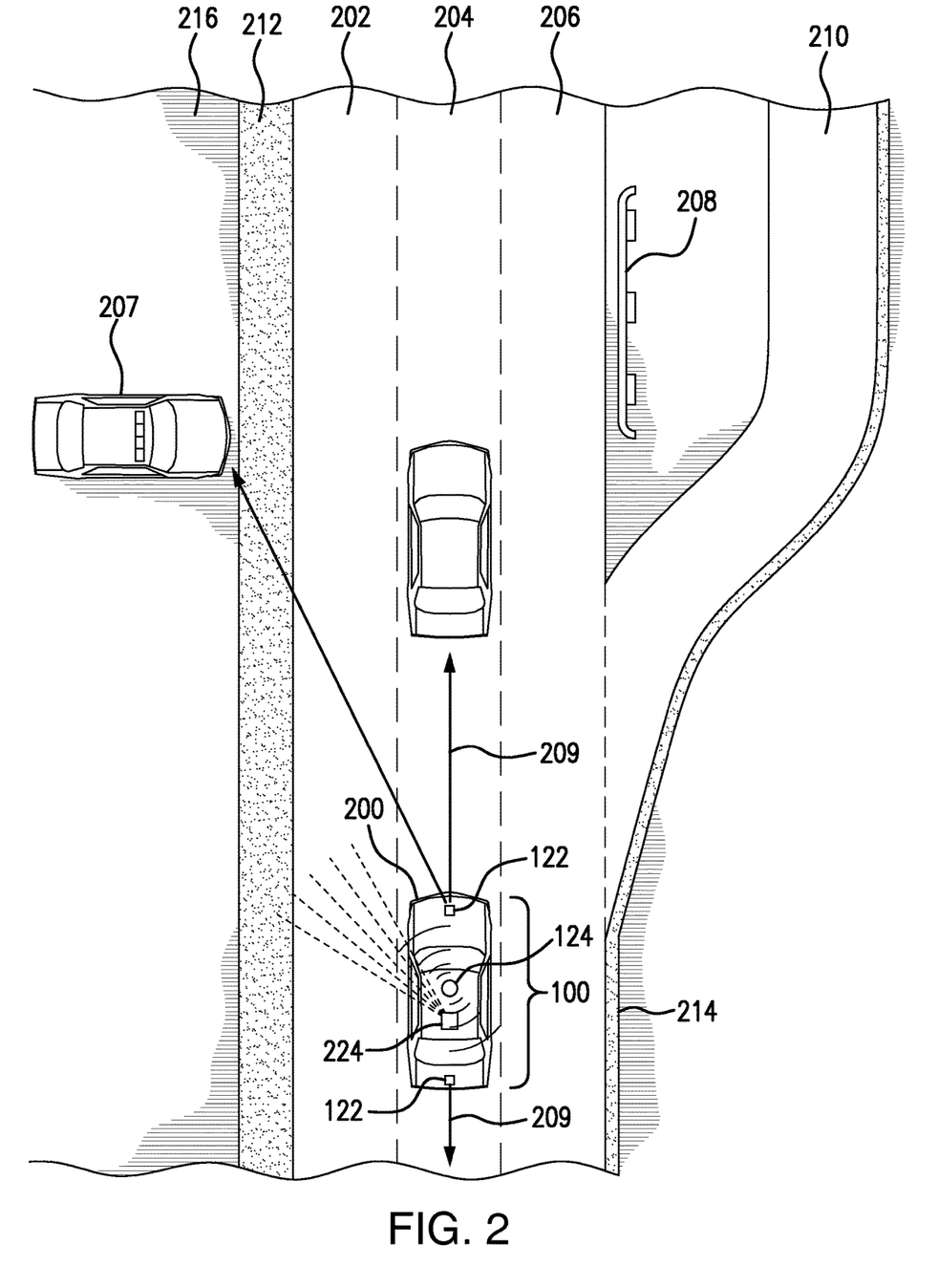
FIG. 2 is an illustrative diagram of an example of a vehicle utilizing a lane-specific guidance system according to an embodiment.

FIG. 2 shows an illustrative diagram of an example vehicle 200 utilizing lane-specific guidance system 100. In the illustrated implementation, lane-specific guidance system 100 may detect information regarding which lane of a plurality of lanes (e.g., first lane 202, second lane 204, and third lane 206) a condition applies to.

In the illustrated example, lane-specific guidance system 100 detects a lane-level police presence. For example, lane-specific guidance system 100 may detect and identify police vehicle 207 via optical character recognition (OCR), computer vision, the like, and/or combinations thereof processing data from vehicle camera 122 and/or vehicle lidar 224. For example, lane-specific guidance system 100 may detect and identify police vehicle 207 presence on a roadside, on a shoulder, or the like, as will be described in greater detail below with regard to FIG. 5. Lane-specific guidance system 100 may assign a lane-level location associated with the police presence. Police vehicle 207 may be detected, identified and located at a median 216, lanes 202/204/206, pull-over lane 210, shoulder 212, and/or curb 214, for example. Additionally or alternatively, lane-specific guidance system 100 may detect and identify police vehicle 207 via information from vehicle radar 124 indicating that radar speed detection is in use in the area. Further, lane-specific guidance system 100 may present the driver with lane-specific data which illustrate police presence based on historical data regarding police stops, police citations, police arrests, the like, and/or combinations thereof.

Additionally or alternatively, lane-specific guidance system 100 may detect lane-level vehicle spacing conditions. For example, lane-specific guidance system 100 may detect and determine vehicle spacing information 209 via vehicle lidar 224 (and/or radar or sonar) and/or computer vision processing data from vehicle camera 122. Lane-specific guidance system 100 may assign a lane-level location associated with the vehicle spacing information 209. Vehicle spacing information 209 may be detected, identified and located at lanes 202/204/206, pull-over lane 210, and/or shoulder 212, for example. Even if traffic is moving at a normal speed, it may be possible that the plurality of vehicles will include many vehicles that are following at unsafe stopping distances. In such a situation a driver may decide to reduce speed based on such lane-level vehicle spacing conditions being communicated. Similarly, a driver may decide to turn on an automatic cruise safety feature of the vehicle, where the cruise speed may be automatically reduced in response to a sensed following distance, for example.

In some examples, the lane-specific data may include one or more of: a lane location, a lane width, a lane edge, a lane edge distance, a curb location, a curb width, a curb distance, a guardrail location, a guardrail size, a guardrail distance, a pull-over lane location, a pull-over lane width, a pull-over lane distance, a shoulder location, a shoulder width, a shoulder distance, the like, and/or combinations thereof. In the illustrated example, lane-specific guidance system 100 may detect lane-level vehicle spacing information from detection and identification of lanes 202/204/206, guardrail 208, pull-over lane 210, shoulder 212, and/or curb 214, for example.

Additionally or alternatively, lane-specific data may include one or more of: lane-level open and closed lane conditions, lane-level crash accident location, lane-level disabled vehicle location, lane-level traffic jam conditions, lane-level pothole conditions, lane-level iced road conditions, lane-level traffic jam conditions, lane-level vehicle speed conditions, the like, and/or combinations thereof. For example, lane-specific guidance system 100 may detect and identify lane-specific data via optical character recognition (OCR), computer vision, the like, and/or combinations thereof processing data from vehicle camera 122 and/or vehicle lidar 224.

Figure 3:
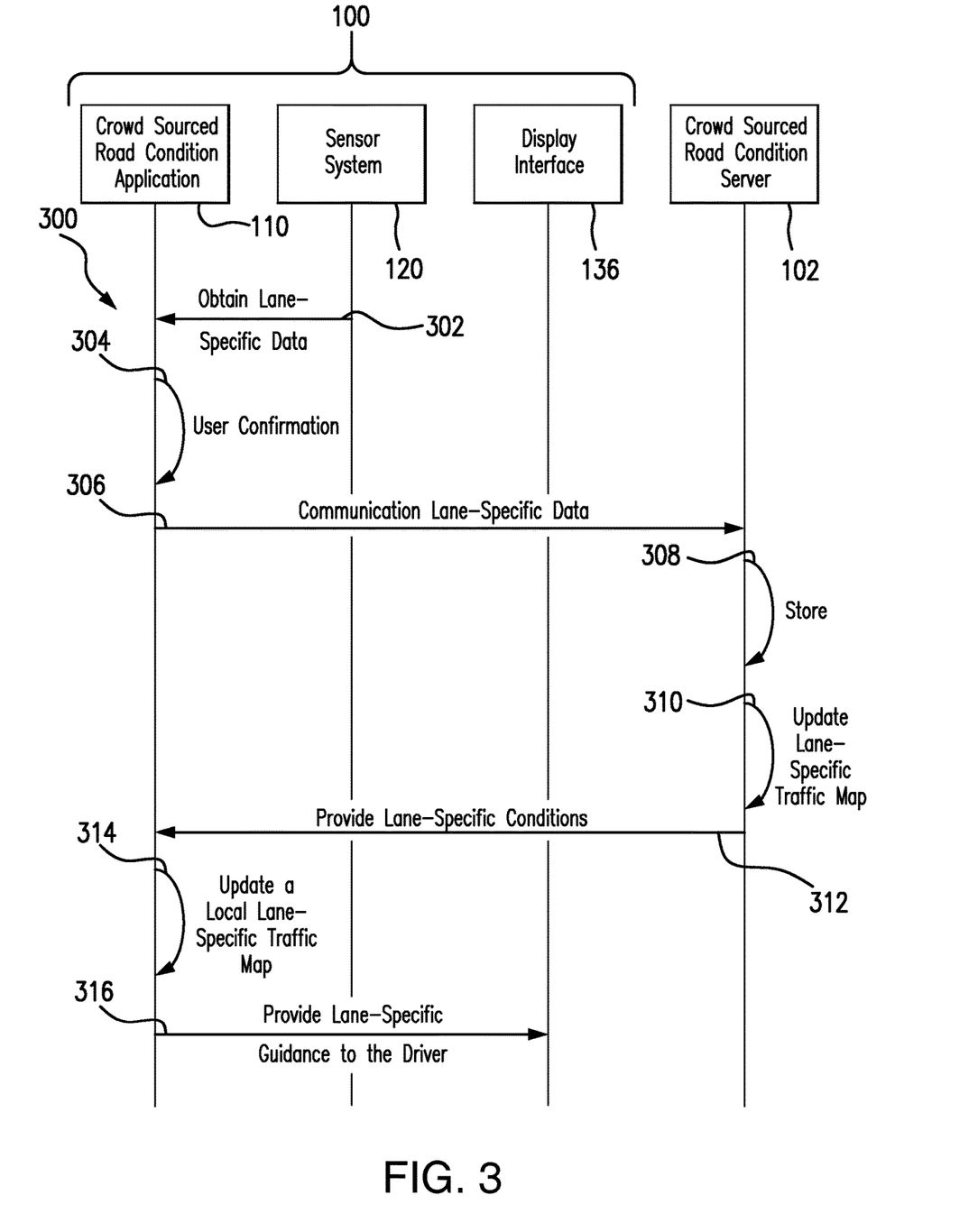
FIG. 3 is a flowchart of an example of a method of operating a lane-specific guidance system of a vehicle according to an embodiment.

FIG. 3 shows a method 300 of operating the lane-specific guidance system 100 to crowd source road related information. In an embodiment, the method 300 may be implemented in logic instructions (e.g., software), configurable logic, fixed-functionality hardware logic, etc., or any combination thereof. While certain portions of lane-specific guidance system 100 are illustrated in method 300, other portions of lane-specific guidance system 100 from FIG. 1 have been intentionally left out to simplify the explanation of the method.

At illustrated processing operation 302, lane-specific data may be obtained. For example, lane-specific data may be obtained via vehicle sensor system 120. The lane-specific guidance system 100 may perform lane identification. Alternatively, the lane identification may be performed remotely, e.g., by the crowd sourced road condition server or by another system in communication with the cloud database.

In some implementations, the lane-specific guidance system 100 may perform lane identification by using information about surrounding objects, such as surrounding vehicles. As used herein, the term "surrounding vehicles" means a vehicle or object located within the sensor range of the vehicle utilizing lane-specific guidance system 100. For example, the vehicle utilizing lane-specific guidance system 100 may track surrounding vehicles that are leading and/or trailing the vehicle utilizing lane-specific guidance system 100. Position data of the surrounding vehicles may be tracked over time. Using such tracked position data of the surrounding vehicles, a current position of the vehicle utilizing lane-specific guidance system 100 may be estimated. For example, a current position of the vehicle utilizing lane-specific guidance system 100 may be estimated at substantially the same longitudinal position as a position of one of the tracked surrounding. For example, in response to determining that the current position of the vehicle is at substantially the same longitudinal position as a previous position of the surrounding vehicles or objects, a lateral offset between the current position of the vehicle and the previous position of the surrounding vehicles or objects can be determined. The lateral offset can be used to identify a current travel lane of the vehicle utilizing lane-specific guidance system 100, determine lane crossings, determine travel lane probability distributions, the like, and/or combinations thereof.

Additionally or alternatively, the lane-specific guidance system 100 may perform lane identification by generating a lane identification confidence belief indicating a probability that the vehicle is in a particular lane of a plurality of lanes of the roadway. The lane identification confidence belief can be based on: any detected lane crossings, the number of lanes in the roadway, the lane marker type to a left side and to a right side of the vehicle at the current position of the vehicle and/or ahead of the current position of the vehicle in a forward direction of travel of the vehicle; and/or a weighted average of an instantaneous lane identification confidence belief and a lane identification confidence belief prior to a current sample time period. In some implementations, the lane identification confidence belief may be calculated based at least in part on a function of a lane identification confidence belief prior to a current sample time, the distance traveled by the vehicle since a last distance reset, a distance traveled by the vehicle during the current sample time, and the instantaneous lane identification confidence vector probability calculated at an instantaneous position of the vehicle in the roadway during the current sample time.

At illustrated processing operation 304, a user confirmation may be prompted and recorded from the user. For example, a communication of the lane-specific data to the crowd sourced road condition server 102 may occur only after confirmation from a user in one mode. In another mode, a communication of the lane-specific data to the crowd sourced road condition server 102 may occur automatically and in another mode.

At illustrated processing operation 306, the lane-specific data may be communicated. For example, the lane-specific data may be communicated from crowd sources road condition application 110 via a communication device (see FIG. 1) to a crowd sourced road condition server 102.

At illustrated processing operation 308, lane-specific data may be received from a plurality of vehicles with a corresponding plurality of vehicle sensor systems and stored. For example, the crowd sourced road condition server 102 may receive the lane-specific data and may store them to the cloud database (see FIG. 1).

At illustrated processing operation 310, a lane-specific traffic map may be updated in response to the received lane-specific data from the plurality of vehicles. For example, the crowd sourced road condition server 102 may update the lane-specific traffic map in response to the received lane-specific data from the plurality of vehicles.

At illustrated processing operation 312, lane-specific conditions may be provided in response to the received lane-specific data from the plurality of vehicles. For example, the crowd sourced road condition server 102 may provide lane-specific guidance to a driver via crowd sources road condition application 110.

At illustrated processing operation 314, a local lane-specific map may be updated in response to the received lane-specific conditions. For example, crowd sources road condition application 110 may update the local lane-specific map associated with the local vehicle in response to the received lane-specific conditions. In one example, the local lane-specific map may be updated to include a police presence associated with a particular lane or portion of a roadway.

At illustrated processing operation 316, lane-specific guidance may be provided to the driver. For example, the updated local lane-specific map may be displayed on display interface 136. In another example, display interface provides audible warnings, suggestions, and/or instructions in response to the lane-specific guidance.

In some implementations, lane-specific guidance including the updated local lane-specific map may provide an identification of the lane with the fastest/slowest traffic based on cloud information from similar vehicles. Additionally or alternatively, lane-specific guidance including the updated local lane-specific map may provide an identification of the intended destination of the traffic from each lane.

Figure 4:
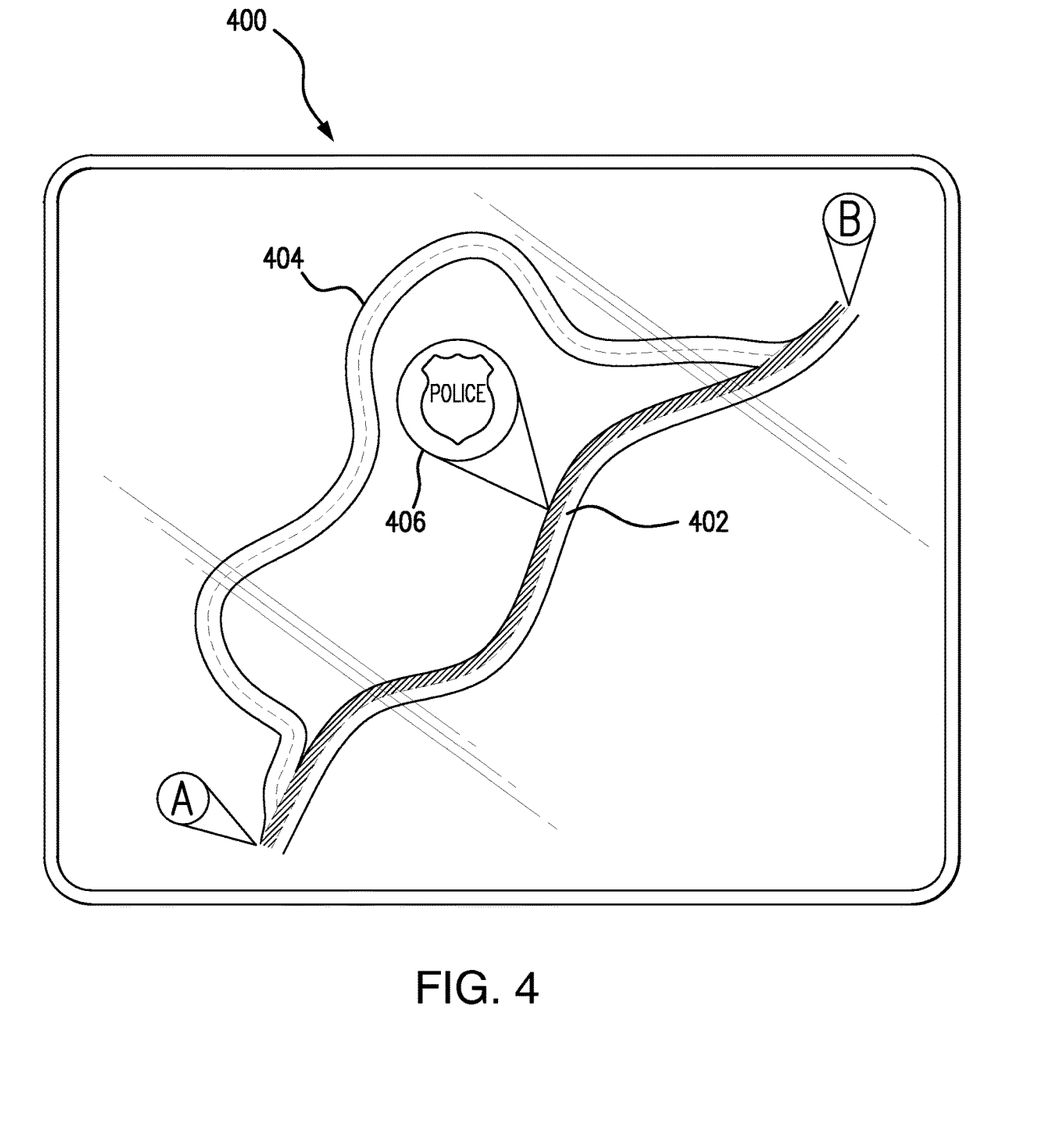
FIG. 4 is an illustrative screen shot of an implementation of a lane-specific guidance system according to an exemplary embodiment.

FIG. 4 shows an illustrative screen shot 400 of the lane-specific guidance system (FIG. 1) issuing guidance to a user based on the crowd sourced road related information. In the illustrated example, the screen shot 400 shows a display of a first route 402 and a second route 404 between point A and point B.

For example, first route 402 may be lane-specific, as illustrated by shading in FIG. 4, noting which of two lanes is recommend. Additionally, first route 402 and second route 404 may be distinguished from one another by the illustrated notification graphic of a police presence 406, which illustrates a lane-specific police presence. For example, a user may choose to change lanes along the first route 402 out of concerns that police presence 406 may slow traffic in a particular lane. Alternatively, a user may choose second route 404, so as to avoid first route 402, out of concerns that police presence 406 may slow traffic along the entire road of first route 402. As discussed above, such a lane-level police presence may be determined from crowd sourcing vehicle camera, vehicle lidar, and/or vehicle radar information. Additionally or alternatively, such a lane-level police presence may be determined based on historical data regarding police stops, police citations, police arrests, the like, and/or combinations thereof.

Figure 5:
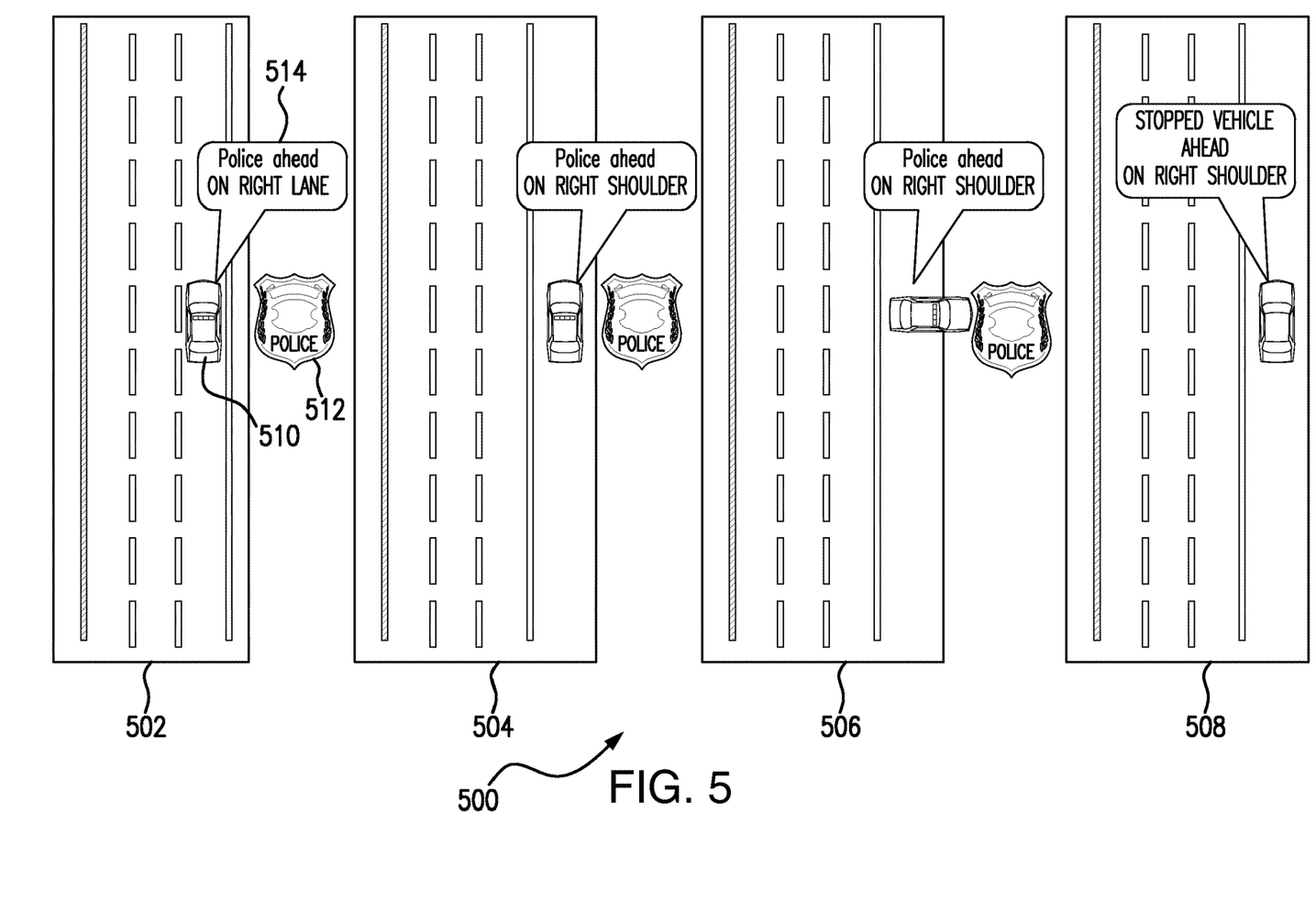
FIG. 5 is an illustrative screen shot of several implementations of a lane-specific guidance system according to an exemplary embodiment.

FIG. 5 shows an illustrative screen shot of several implementations of a lane-specific guidance system (FIG. 1) issuing guidance to a user based on the crowd sourced road related information. In the illustrated example, the screen shot 500 shows a display of a police presence in a particular lane for illustrated notification graphic 502, a police presence along a shoulder for illustrated notification graphic 504, a police presence perpendicular to a shoulder for illustrated notification graphic 506, and a stopped vehicle ahead on a shoulder for illustrated notification graphic 508.

For example, the notification graphic of a police presence 406 of FIG. 4 may be presented as the police presence in a particular lane 502, the police presence along a shoulder 504, the police presence perpendicular to a shoulder 506, the like, or combinations thereof, depending on the particular determined police presence. In the illustrated example, each of illustrated notification graphics 502, 504, 506, and/or 508 may include several components. For example, each of illustrated notification graphics 502, 504, 506, and/or 508 may include an illustrated vehicle component 510 (e.g., an illustrated police vehicle, an illustrated stopped vehicle, an illustrated crashed vehicle, an illustrated emergency vehicle, the like, or combinations thereof), an icon representation component 512 (e.g., a badge-type icon, a siren-type icon, the like, or combinations thereof), and/or a text notice component 514 (e.g., police ahead on right lane, police ahead on shoulder, stopped vehicle ahead on right shoulder, or the like). Additionally, or alternatively, each of illustrated notification graphics 502, 504, 506, and/or 508 may include an arrow component (not illustrated) to indicate which lane, shoulder, or other location the police vehicle (or other vehicle) is located or traveling along.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system to crowd source road related information, comprising:
    a vehicle sensor system to obtain lane-specific data, wherein the vehicle sensor system includes a vehicle radar to monitor whether radar speed detection is in use in an area; and
    a communication device coupled to the vehicle sensor system, the communication device to communicate the lane-specific data to a server and to receive lane-specific conditions from the server, the lane-specific conditions relating to a specific driving lane among a plurality of driving lanes,
    wherein the lane-specific data indicates at least a lane-level police presence, the lane-level presence indicating the driving lane among the plurality of driving lanes in which police are located,
    wherein the lane-specific conditions received from the server are based at least in part on the lane-specific data from the vehicle radar indicating that radar speed detection is in use in the area.

2. The system of claim 1, wherein the communication of the lane-specific data to the server occurs automatically in one mode and occurs only after confirmation from a user in another mode.

3. The system of claim 1, wherein the vehicle sensor system comprises one or more of a vehicle camera and a vehicle location system, and wherein the vehicle location system comprises a Global Positioning System.

4. The system of claim 1, wherein the lane-specific data further comprises information related to one or more of: a guardrail size or a guardrail distance.

5. The system of claim 1, wherein the plurality of driving lanes is identified for a current vehicle at least based on information from vehicles leading and trailing the current vehicle.

6. At least one non-transitory computer readable storage medium comprising a set of executable program instructions, which when executed by a computing system, cause the computing system to:
    automatically obtain, via a vehicle sensor system, lane-specific data, wherein the vehicle sensor system includes a vehicle radar to monitor whether radar speed detection is in use in an area;
    communicate, via a communication device coupled to the vehicle sensor system, the lane-specific data to a server; and
    receive, via the communication device, lane-specific conditions from the server, the lane-specific conditions relating to a specific driving lane among a plurality of driving lanes,
    wherein the lane-specific data indicates at least a lane-level police presence, the lane-level presence indicating a specific driving lane among the plurality of driving lanes in which police are located,
    wherein the lane-specific conditions received from the server are based at least in part on the lane-specific data from the vehicle radar indicating that radar speed detection is in use in the area.

7. The at least one non-transitory computer readable storage medium of claim 6, wherein the communication of the lane-specific data to the server occurs automatically in one mode and occurs only after confirmation from a user in another mode.

8. The at least one non-transitory computer readable storage medium of claim 6, wherein the vehicle sensor system comprises one or more of a vehicle camera and a vehicle location system, and wherein the vehicle location system comprises a Global Positioning System.

9. The at least one non-transitory computer readable storage medium of claim 6, wherein the lane-specific data comprises information related to one or more of: a guardrail location or a guardrail size.

10. The at least one non-transitory computer readable storage medium of claim 6, wherein the plurality of driving lanes is identified for a current vehicle at least based on information from vehicles leading and trailing the current vehicle.

11. A method to crowd source road related information, comprising:
    obtaining, via a vehicle sensor system, lane-specific data, wherein the vehicle sensor system includes a vehicle radar to monitor whether radar speed detection is in use in an area;
    communicating, via a communication device coupled to the vehicle sensor system, the lane-specific data to a server; and
    receiving, via the communication device, lane-specific conditions from the server, the lane-specific conditions relating to a specific driving lane among a plurality of driving lanes,
    wherein the lane-specific data indicates at least a lane-level police presence, the lane-level presence indicating a specific driving lane among the plurality of driving lanes in which police are located,
    wherein the lane-specific conditions received from the server are based at least in part on the lane-specific data from the vehicle radar indicating that radar speed detection is in use in the area.

12. The method of claim 11, wherein the communication of the lane-specific data to the server occurs automatically in one mode and occurs only after confirmation from a user in another mode.

13. The method of claim 11, wherein the vehicle sensor system comprises one or more of a vehicle camera and a vehicle location system, and wherein the vehicle location system comprises a Global Positioning System.

14. The method of claim 11, wherein the lane-specific data comprises information related to one or more of: a guardrail size or a guardrail distance.

15. The method of claim 11, wherein the plurality of driving lanes is identified for a current vehicle at least based on information from vehicles leading and trailing the current vehicle.

* * * * *